United States Patent Office 2,755,032
Patented July 17, 1956

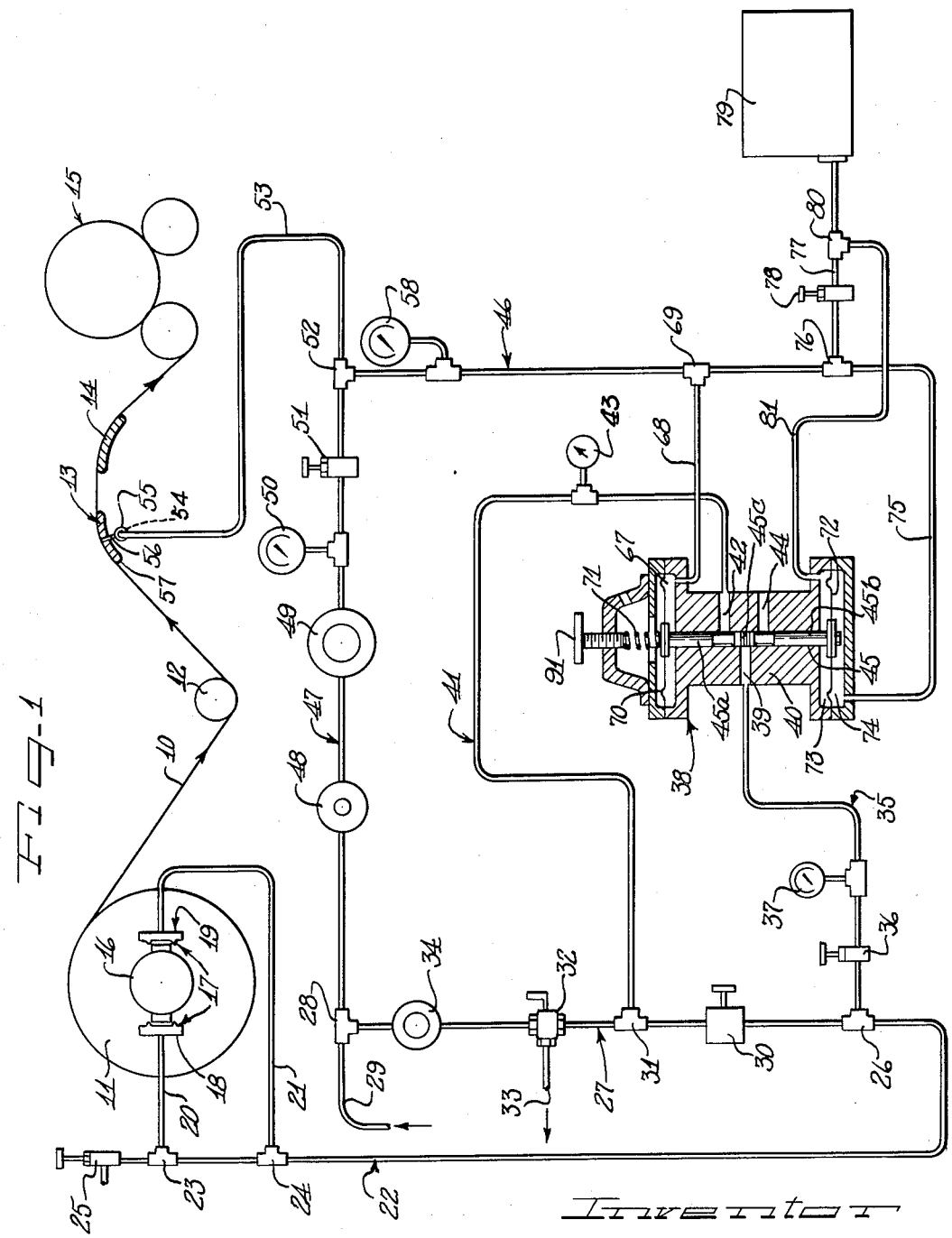

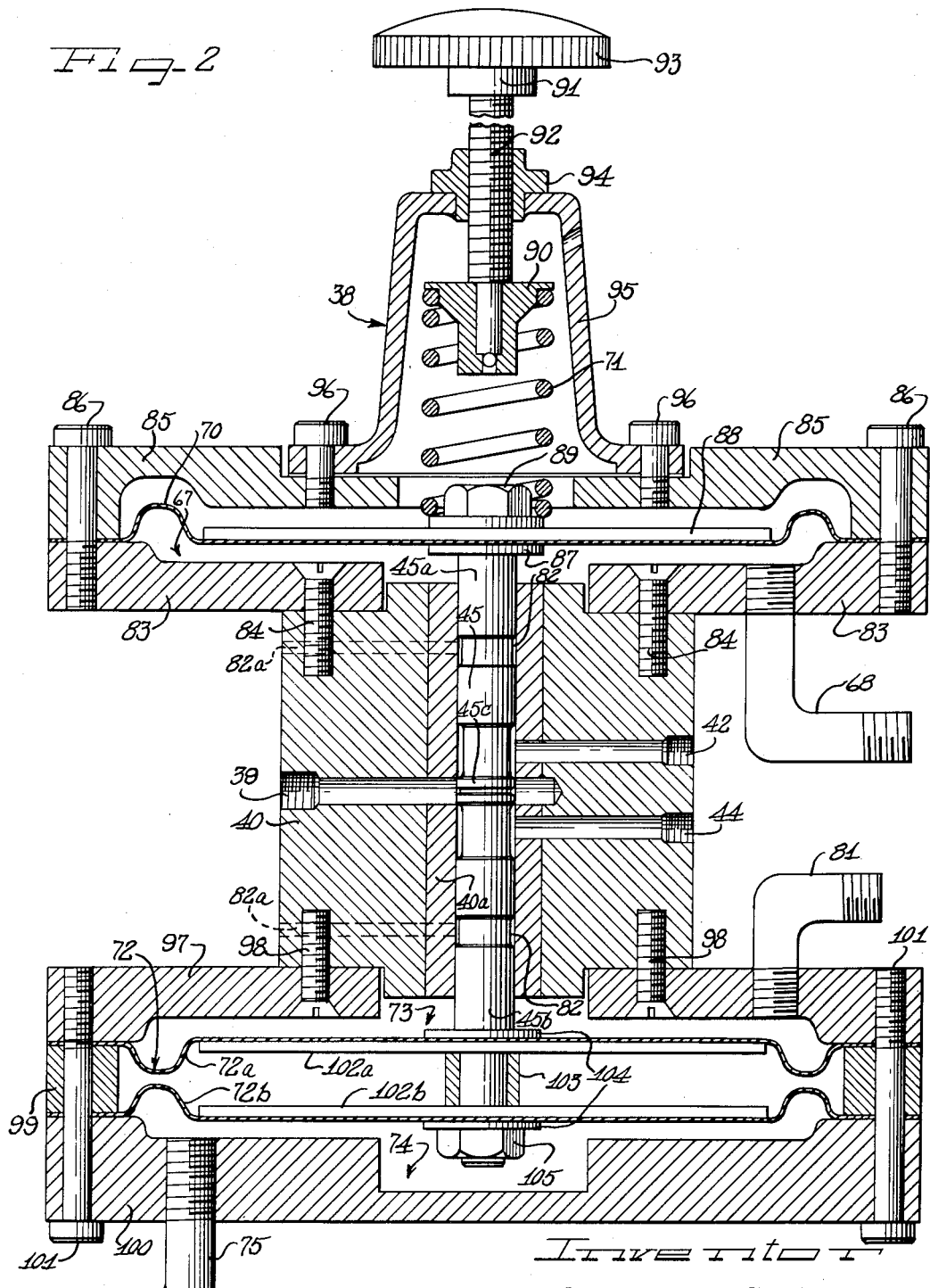

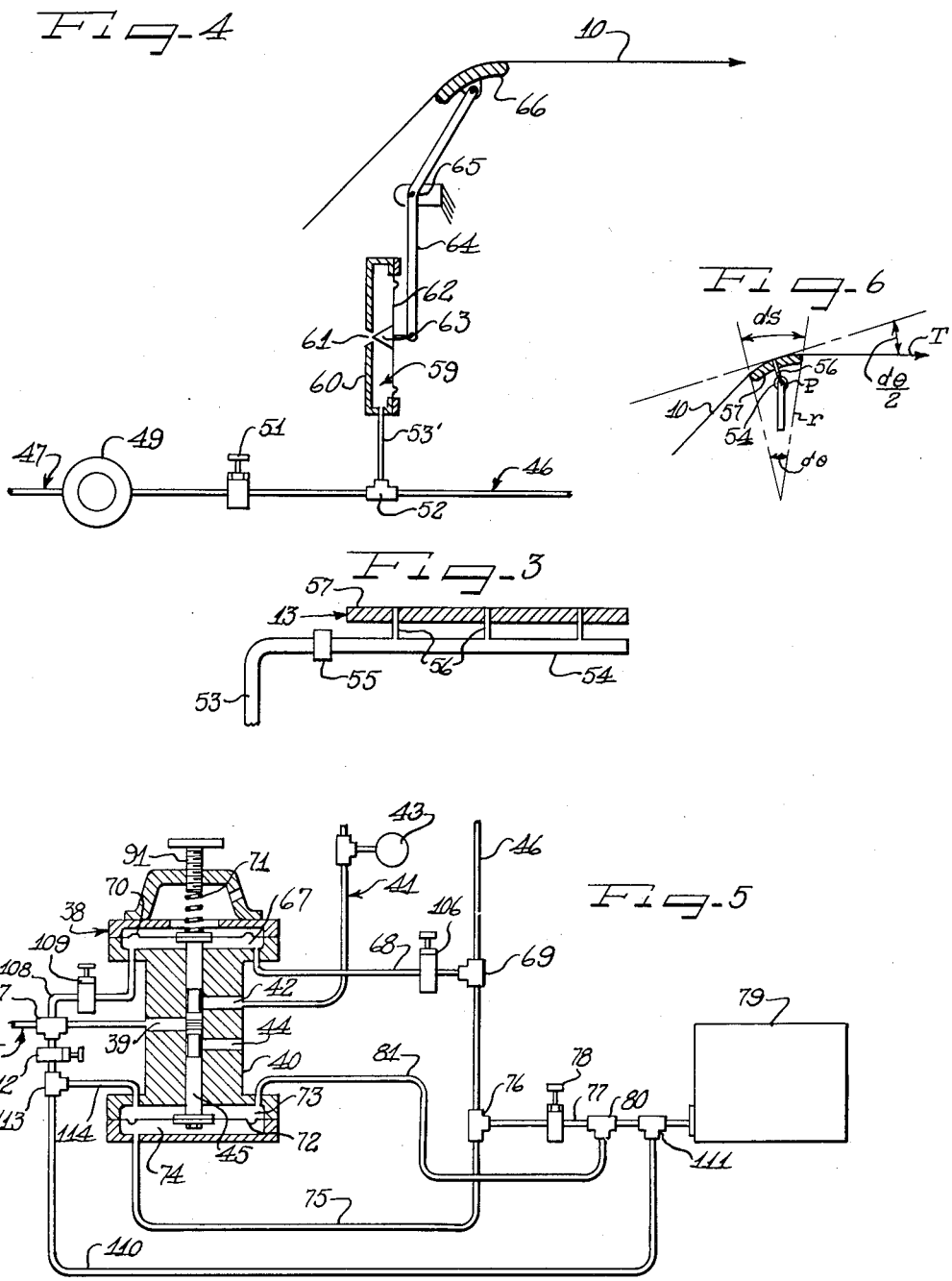

2,755,032

TENSION REGULATOR AND GUIDE AND CONTROL MEANS THEREFOR

Edgar J. Justus, Beloit, Wis., assignor to Beloit Iron Works, Beloit, Wis., a corporation of Wisconsin Application December 17, 1951, Serial No. 262,010

7 Claims. (Cl. 242—75)

The present invention relates to control means for the operation of a fluid actuated motor and, more particularly, to a tension regulator and guide and control means therefor suitable for use in controlling the unwinding of sheet material from a roll.

The tension regulator of the present invention contemplates generally the utilization of a fluid actuated motor, in this case an air brake, on an unwind roll, whose resistance to rotation is controlled by means responsive to the tension on sheet material being unwound from the roll. Such control means are thus used for imparting actuating fluid pressure to a fluid pressure responsive motor in response to a variation in operation which the motor may control, in this case, variable tension on the sheet material which the air brake may control.

In the instant invention, a first valve means controls fluid communication between a source of fluid under pressure and the fluid pressure actuated motor. The first valve means is itself actuated in response to fluid pressure which is imparted thereto by a second valve means which is, in turn, responsive to a variation in operation such as the tension. It will thus be seen that the first valve means delivers actuating fluid pressure from a suitable source in response to a fluid pressure signal also received from said source via the second valve means.

It is, therefore, an important object of the instant invention to provide an improved control means for imparting actuating fluid pressure to a fluid pressure responsive motor in response to a variation in operation which the motor may control.

It is another object of the instant invention to provide an improved control valve means for delivering actuating fluid pressure in response to a fluid pressure signal.

It is a further object of the instant invention to provide a tension regulator for controlling the tension on sheet material being unwound from a roll, including an air brake for the roll, an air pressure source, an air pressure responsive valve in control of communication between the brake and the source, and valve means responsive to the tension on the sheet material for imparting actuating air pressure to the air pressure responsive valve.

Other and further important objects of this invention will be apparent from the disclosures in the specification and the accompanying drawings.

On the drawings:

Figure 1 is essentially a diagrammatical view of a tension regulator embodying the invention;

Figure 2 is an enlarged sectional elevational view of the control valve shown in Figure 1;

Figure 3 is a fragmentary detailed view of the tension sensing shoe member of Figure 1;

Figure 4 is a fragmentary view, showing parts in section and parts diagrammatically, of another tension sensing shoe member embodying the invention;

Figure 5 is a fragmentary view of a modified "damping" piping arrangement for the control valve embodying the invention; and Figure 6 is a diagrammatic view showing the relationship between the web and the tension sensing shoe member of Figure 3.

As shown on the drawings:

In Figure 1, the reference numeral 10 designates generally a traveling sheet of material, such as a paper web, traveling in the direction indicated by the arrows. The sheet 10 is being unwound from an unwind roll 11, passing from the periphery of the roll 11 under a guide roll 12 over a tension sensing shoe 13, and a guide shoe 14 and under the first roll of the rewinder assembly 15.

The axle portion 16 of the unwind roll 11 is suitably provided with brake means 17 that are actuated by fluid pressure actuated motors, in the form of brake diaphragms 18 and 19. The brake diaphragms 18 and 19 are standard air brake diaphragms which have a construction well known in the art and need not be further described in this specification. The application of air pressure to such brake diaphragms 18 and 19 effectively actuates the same so as to produce a braking effect upon the unwind roll 11 and thereby to increase the tension on the sheet material 10 being drawn from the unwind roll 11 to the roll assembly 15.

A pair of actuating air pressure lines 20 and 21 afford fluid communication between the brake diaphragms 18 and 19 respectively and an actuating air pressure header 22, the lines 20 and 21 being connected to the header 22 by means of standard T connections 23 and 24 respectively.

At the extremity of the header 22 near the unwind roll is a needle valve 25 adapted to bleed air pressure from the header 22 for use in manual control of the brake means 17; but ordinarily the needle valve 25 is closed during automatic operation.

The actuating air pressure header 22, and the lines 20 and 21, constitute a variable air pressure system, in that the air pressure in said system is varied in a predetermined controlled manner so as to apply the proper and desired actuating air pressure to the air brake means 17. At the end of the header 22 opposite the end at which the needle valve 25 is located, there is suitably positioned another T connection 26, which affords communication to two different means for delivering actuating air pressure to the header 22.

One of the means for delivering actuating air pressure to the header 22 via the T connection 26 comprises a manual control header designated generally by the reference numeral 27. The manual control header extends communicatingly from the T connection 26 to a T connection 28 which in turn communicates with an air pressure source (not shown) through the source line 29. In actual practice, the source line 29 is connected to, for example, a compressed air supply header wherein the air is maintained at a pressure such as sixty pounds per square inch. The manual control header 27 has operatively positioned therein a by-pass gate valve 30 near the T connection 26; and during manual operation, the gate valve 30 is maintained in an open position to permit fluid communication therethrough and thereby to by-pass the automatic control valve, as will be explained hereinafter.

Near the middle of the manual control header 27, there is positioned another T connection 31, which is positioned on the side of the gate valve 30 opposite the side at which the T connection 26 is positioned and which affords communication to the automatic control portion of the system in a manner which will be explained hereinafter. In the header 27 on the side of the T connection 31 opposite the side on which the gate valve 30 is mounted is a three-way valve 32, which is adapted to selectively permit free fluid communication therethrough in the header 27 and to vent the header 27 to an exhaust line 33. During manual or automatic operation, the three-way valve 32 is normally so positioned that it permits free fluid communication through the header 27 and prevents the header 27 from being vented to the exhaust line 33.

Suitably positioned in the header 27 between the three-way valve 32 and the T connection 28 is a manual air pressure regulator 34; the regulator 34 is a well known type of air pressure reducer used in the control of compressed air, and its specific structure need not be discussed herein. Such regulators may be set manually so as to maintain a given air pressure output. For example, the regulator 34, having supply air pressure of perhaps sixty pounds per square inch exerted against the upstream side of the regulator may be manually set so as to constantly maintain 10 pounds per square inch air pressure on its downstream side in the header 27 and, it will thus be seen that by manual operation of the regulator 34, it is possible to impart to the manual control header 27 and the actuating air pressure header 22 communicating therewith, a given predetermined air pressure for actuation upon the air brake means 17 through the lines 20 and 21. The needle valve 25 may be used in cooperation with the regulator 34 in order to obtain various desired air pressures in the headers 22 and 27.

Referring now to the second or automatic means for supplying actuating air pressure to the header 22 through the T connection 26, it can be seen that the T connection 26 communicates with an automatic control header designated generally by the reference numeral 35. The automatic control header 35 has suitably positioned therein a gate valve 36 adjacent the T connection 26, such gate valve being closed during manual operation and opened during automatic operation. Also, the automatic control header 35 has suitably mounted therein an air pressure gauge 37, which is used to indicate the air pressure being applied to the air brakes 17 during automatic operation.

The automatic control header 35 is adapted to afford fluid communication between the T connection 26 and a control valve designated generally by the reference numeral 38. The header 35 communicates with the interior of the valve 38 by means of a passageway 39 in the cylindrical sleeve-like body portion 40 of the valve 38.

A control supply header 41 is communicatingly connected at one of its ends to the manual control header 27 at the T connection 31. The other end of the header 41 is connected to the valve 38 and communicates with the interior thereof by means of a passageway 42 in the body portion 40 of the valve 38. The control supply header 41 also has suitably mounted thereon an air pressure gauge 43 for designating the more or less constant pressure of the air which is available to be supplied to the control valve 38 for automatic control. The passageway 42 is opposite and spaced axially above the passageway 39 in the valve body 40, and a third passageway 44 on the same side of the valve body 40 as the passageway 42, but spaced axially below the passageway 39, affords a means for venting the interior of the valve 38 to the atmosphere.

A valve piston 45 is mounted cooperatingly in the body 40 for vertical axial movement relative to the valve body 40. The piston 45 has valve land portions 45a and 45b near its extremities for slidably engaging the body portion 40 so as to form fluid seals therebetween. Near the middle of the valve piston 45 is a third valve land portion 45c normally closing or lapping the passageway 39, as shown in Figure 1. It will be noted that the diameter of the piston 45 is substantially reduced between the land portions 45a and 45c (aligned with the passageway 42) and between the land portions 45c and 45b (aligned with the passageway 44).

Accordingly, it will be seen that if the piston 45 is moved downwardly, the movement of the land portion 45c will uncover the passageway 39 thereby affording fluid communication from the control supply header 41 through the passageway 42, the interior of the valve 38, the passageway 39 and the automatic control header 35 to the actuating air pressure header 22. In contrast, upward movement of the piston 45 results in upward movement of the land portion 45c so as to permit venting of air pressure through the passageway 39, the interior of the valve 38 and the venting passageway 44 to the atmosphere.

During automatic operation, the gate valve 30 is closed and the manual control regulator 34 is set so as to maintain a fixed supply pressure of, for example, 50 pounds per square inch in the supply header 41. The movement of the piston 45 then controls the air pressure which is maintained in the actuating air pressure header 22, since an increase in that pressure may be effected by downward movement of the piston 45 and a decrease in that pressure may be effected by upward movement of the piston 45. It will also be seen that the three-way valve 32 acts as an on-off actuator for the automatic control, since that valve controls the supply of air to the control valve 38 and it automatically cuts off the supply of air to the control valve 38 when it is set in a position so as to vent air through the exhaust line 33.

As can be seen from the drawings, the movement of the piston 45 is controlled by diaphragm means which will be described in detail later. The diaphragm means are actuated by signal air pressure which is obtained from a signal air pressure header designated generally by the reference numeral 46 and the air pressure to the signal air pressure header 46 is supplied by a signal supply header designated generally by the reference numeral 47.

The signal supply header 47 is connected communicatingly with the compressed air source line 29 by means of the T connection 28. The compressed air flows from the supply line 29 through the T connection 28, through an air filter 48 to an air pressure reducer 49, which is adapted to maintain a predetermined constant reduced air pressure at the downstream side thereof. The air filter 48 and the air reducer 49 are well known devices employed in the handling of compressed air, particularly for instrument or signal purposes, and need not be described further for the purposes of the instant specification. At the downstream side of the air pressure reducer 49 in the supply header 47 is suitably mounted an air pressure gauge 50 for indicating the reduced pressure in the downstream end line.

The header 47 extends downstream from the air pressure gauge 50 to a needle valve 51 which affords restricted communication between the signal supply header 47 and the signal air pressure header 46. In the signal air pressure header 46 adjacent the needle valve 51 is a T connection 52 affording fluid communication between the signal air pressure header 46 and a bleed valve line 53, which in turn communicates with the tension sensing shoe 13.

Referring to Figure 3, wherein a sectional view of the shoe 13 extending transversely of the traveling web 10 is shown, it can be seen that the shoe 13 consists of a hollow shaft member or header 54 connected communicatingly to the bleed valve line 53 by the pipe coupling 55. The header 54 extends beneath and transversely of the traveling web 10 and has extending upwardly therefrom a plurality of pipe members 56 which support a board member 57 longitudinally aligned with the header 54. The board member 57 is adapted to extend transversely for slidable engagement with the traveling web 10 and it is suitably apertured to receive the pipe members 56.

It will thus be seen that the pipe members 56 afford fluid communication from the interior of the header 54 to the atmosphere through apertures in the board member 57. During normal operation, such apertures are covered by the traveling web 10. However, the extent to which the traveling web 10 closes off such apertures so as to prevent leakage or bleeding of air pressure therethrough depends upon the tension exerted on the web 10. It will, of course, be appreciated that the greater the tension upon the web 10 the greater the tendency of the web 10 to press against the board member 57, thereby to increase its effectiveness in preventing air leakage through the apertures.

Referring to Figure 6, it will be seen that the instant tension sensing device is uniquely adapted to give a direct tension reading to the operator during automatic control. As shown in the dotted lines in Future 6, the web 10 is deflected in its travel over the arcuate surface of the board member 57, while it covers the apertures of the board member 57. The apertures communicate via the support pipes 56 with the interior of the shaft 54. The tension on the web is T (pounds per inch of width). Since the web is relatively air impermeable under such conditions, the air pressure at the apertures as well as in the interior of the shaft 54 is P (pounds per square inch); and that pressure is also the pressure exerted downwardly by the web 10 along the arcuate line of contact $ds$ (inches) between the web 10 and the board member 57. The incremental arc $ds$ has a radius $r$ (inches) and subtends the incremental single $d\theta$.

It will thus be seen that sum of the vertical forces ($\Sigma$ v. f.) may be represented as follows in Equation 1:

(1) $$\Sigma \text{ v. f.} = Pds - 2T \sin \frac{d\theta}{2}$$

For small angles $$\sin \frac{d\theta}{2} = \frac{d\theta}{2} \text{ (radians)}$$

therefore, it follows from Equation 1 that:

(2) $$Pds = 2T \sin \frac{d\theta}{2}$$

(3) $$Pds = 2T\frac{d\theta}{2}$$

(4) $$P = T\frac{d\theta}{ds}$$

Also, it is known that:

(5) $$r \text{ (inches)} = \frac{ds \text{ (inches)}}{d\theta \text{ (radians)}}$$

Therefore:

(6) $$P = \frac{T}{r} = \frac{\text{lbs./in.}}{\text{in.}} = \frac{\text{lbs.}}{\text{in.}^2}$$

It will thus be seen that the air pressure P in the interior of the header 54 is directly proportional to the tension T on the web and inversely proportional to the radious $r$ of the subtended arc of contact $ds$. Contrary to popular belief, pressure P is proved to be practically independent of angle of wrap $\theta$. By calibrating the air pressure gauge 58 in the signal air pressure header 46 to read the air pressure P divided by the radius $r$, it is possible to obtain a direct reading of the tension T at the gauge 58.

It should be noted also that although the instant apparatus is uniquely adapted to operate in response to variations in the tension, it also might be used for other purposes. For example, the apertures in the board 57 might be positioned at an edge of the traveling web 10 so as to sense variations in lateral movement of the web 10 and to correct the same by the use of a suitable air motor to move the unwind roll 11 laterally, instead of applying brakes thereto.

Referring to Figure 4, wherein an alternative bleed valve line 53' is shown, it will be seen that the bleed valve 53' is positioned with respect to the signal air pressure header 46 in substantially the same manner that the bleed valve line 53 of Figure 1 is positioned. The bleed valve line 53' extends from the T connection 52 in the header 46 to a bleed valve chamber designated generally by the reference numeral 59. The bleed valve chamber 59 is defined by a generally dish shaped member 60 having a central aperture at 61 and a diaphragm member 62 peripherally clamped to the open side of the dish shaped member 60. The diaphragm member 62 carries a valve member 63 opposed to the aperture 61 in the dish shaped member 60 and adapted to close the aperture 61 in response to inward movement of the diaphragm member 62. The diaphragm member 62 is pivotally connected to one extremity of a lever arm 64, which, is mounted at the central portion thereof upon a fixed pivot 65. The other extremity of the lever arm 64 is connected to a board member 66, which is adapted to slidably engage the web 10 much in the same manner that the board member 57 engages the web 10. The board member 66 could also be a roll.

The board member 66, however, is not apertured and, instead, is adapted to receive and to provide a force in response to variations in the tension upon the web 10. It will be seen that an increase in the tension upon the web would result in a downward thrust against the board member 66 which in turn would tend to urge the valve member 63 into the aperture 61 so as to close the same and to decrease the bleeding of air to the atmosphere through the aperture 61. Accordingly, an increase would be effected in the signal air pressure header 46, until the reaction force of the diaphragm 62 caused the force of the shoe to again equal the force of the web.

Referring again to Figure 1, it will be seen that the signal air pressure header 46 communicates with a top diaphragm chamber 67 by means of a signal line 68 connected to the header 46 by means of a T connection 69. As can be appreciated, an increase in the signal air pressure thus being introduced into the top diaphragm chamber 67 acts against the top diaphragm 70 so as to move the piston 45 upwardly and thereby to effectively vent some of the air pressure in the headers 35 and 22. It will thus be seen that an increase in tension on the web 10 causes an increase in the signal air pressure which in turn actuates the valve 38 so as to effect a decrease in the actuating air pressure communicating with the air brakes, 17.

Referring first to Figure 1, it will be seen that an adjustable spring 71 is positioned above and in contact with the top diaphragm 70 so as to resist upward movement thereof in response to signal air pressure increases. The spring 71 may be adjustably set to resist movement of the diaphragm 70 to a predetermined extent by means which will be described hereinafter.

A bottom diaphragm 72 is mounted at the bottom of the piston 45 and separates an upper diaphragm chamber 73 from a lower diaphragm chamber 74. The signal air pressure header 46 communicates with the lower diaphragm chamber 74 by means of a signal line 75 suitably connected to the header 46 by means of a T connection 76. Also, connected to the header 46 by means of the T connection 76 is a volume or surge tank line 77 having therein a throttle valve 78 and being communicatingly connected to a volume or surge tank 79. By means of a T connection 80 in the tank line 77 between the throttle valve 78 and the surge tank 79, there is communicatingly connected to the surge tank line 77 a surge tank signal line 81 which communicates with the upper diaphragm chamber 73.

It will be seen that, during automatic operation, the effect of the surge tank signal air pressure against the bottom diaphragm 72 is a valve damping effect. In other words, an increase in the signal air pressure in the header 46 effects an increase in the air pressure in the lower diaphragm chamber 74 by means of the signal line 75. At the same time, the increase in air pressure in the header 46 begins to increase the pressure in the surge tank 79 by bleeding through the throttle valve 78. In a comparatively short time (which may be determined by control of the throttle valve 78) the pressure in the surge tank 79 reaches a pressure that is the same as that in the header 46 and, accordingly, the surge tank signal line 81 permits an equalizing pressure to be formed in the upper diaphragm chamber 73, thereby tending to return the piston 45 to its original position. In this manner, the piston 45 may be started back to its original position before it has a chance to produce a change in the actuating air pressure against the air brake members 17 that is greater than that necessary to correct the tension on the web 10.

It will be appreciated that in the case of a decrease in pressure in the header 46, the air flows from the surge tank 79 through the throttle valve 78 and into the header 46 until an equal pressure is obtained on opposite sides of the valve 78 and a neutralizing effect is correspondingly obtained in the pressures on opposite sides of the diaphragm 72.

Referring to Figure 2, which is a detailed view of the control valve 38, it can be seen that the cylindrical sleeve-like body portion 40 has an inner sleeve-like portion 40a which provides a bearing surface for slidably engaging the valve land portions 45a, 45b and 45c of the piston 45. Recesses are provided in the valve piston at 82 which are vented to the atmosphere thru the passages 82a to prevent the leakage of air fluid from the valve into the diaphragm chamber or vice versa.

The passageways 42 and 44 are internally threaded near the outside of the valve body 40 so as to receive the necessary air lines, and the passageways 42 and 44 extend through the body portion 40 and the inner sleeve portion 40a so as to communicate respectively with the spaced annular chambers defined by the inner sleeve portion 40a and the piston 45 and separated by the valve land portion 45c.

The passageway 39 is threaded at its outer extremity so as to receive and threadedly engage the automatic control header 35, and the passageway 39 extends through the body portion 40, the inner sleeve portion 40a adjacent thereto and through the inner sleeve portion 40a opposite the entering side of the passageway 39. The valve land portion 45c which laps or closes the passageway 39 as shown in Figure 2 contains a peripheral groove so that air pressure from the automatic control header 35 will be uniformly distributed on opposite sides of the land portion 45c, thereby avoiding any side thrust. Since the passageways 42 and 44 also communicate with an annular chamber which completely surrounds the piston 45, any tendency toward side thrust against the piston 45 by air pressure is avoided.

In addition, it should be pointed out that it has been found advantageous in the operation of the instant control valve to so design the land portion 45c that it fails to lap completely, to so design the land portion 45c that it fails to close completely the passageway 39, so that a very slight air bleed is maintained through the passageway 39 past the bottom edge of the land portion 45c through the corresponding annular chamber and out the vent passageway 44.

A dish shaped upturned annular member 83 is suitably mounted on shoulders at the top of the valve body portion 40, for example, by means of screws 84 threadedly engaging the annular member 83 and clamping the same to the top of the valve body 40. The flexible top diaphragm 70 is peripherally clamped between the upturned annular member 83 and an inverted dish shaped annular mating member 85, by means of threaded bolts 86. The diaphragm 70 is attached to the top of the piston 45 by being clamped between the lower washer 87 and an upper annular shield member 88 held together by means of a nut 89 threadedly engaging the top threaded portion of the piston 45.

The control spring 71 engages a raised portion of the annular guard member 88 surroundingly of the nut 89 and extends upwardly into engagement with a backing member 90. The spring 71 urges the backing member upwardly against an adjustable set screw 91 comprising a threaded body portion 92 and a handle portion 93 adapted to effect manual rotation of the threaded body portion 92. The threaded body portion 92 engages an internally threaded yoke member 94 which is fitted in a housing member 95 that extends downwardly and surroundingly of the spring 71 into engagement with the back of the inverted annular dish shaped member 85 and is securely mounted thereto by means of threaded bolts 96.

The housing member 95 thus encloses the spring 71 and furnishes support for the yoke member 94 so that the set screw 91 may be employed to controllably adjust the extent to which the spring 71 is compressed against the annular guard member 88. As has been mentioned hereinbefore, the signal air pressure enters through the signal line 68 into the top diaphragm chamber 67 and exerts pressure upwardly against the diaphragm 70. The spring 71 and set screw 91 are so adjusted during operation that desired predetermined signal pressures are required in order to effect upward movement of the piston 45, to hold the piston 45 in place and to permit the spring 71 to move the piston 45 downward.

An inverted dish shaped annular member 97 is suitably mounted in shoulders at the bottom of the body member 40 by means of screw members 98. It will be noted that the diaphragm means 72 forming the bottom diaphragm 72 consist of a pair of flexible diaphragms 72a and 72b. In the assembly thereof, the diaphragm 72a is peripherally clamped to the inverted dish shaped member 97 by means of a ring member 99, and the flexible diaphragm 72b is peripherally clamped to the bottom of the ring member 99 by means of an upturned dish shaped mating member 100. The annular dish shaped member 97, the ring member 99 and the mating dish shaped member 100 effectively clamp the peripheries of the flexible diaphragms 72a and 72b in the properly assembled position by means of peripherally positioned bolts 101 passing through apertures in the mating member 100 and the ring member 99 into threaded engagement with the annular member 97.

The two flexible diaphragms 72a and 72b are employed so that guard members 102a and 102b respectively may be employed to support the side of each of the flexible diaphragms 72a and 72b that is not subjected to fluid pressure. The guard members 102a and 102b have substantially the same shape and function as the guard member 88 had with respect to the top diaphragm 70 and such members are separated by a cylindrical spacer 103 mounted on the piston 45. Each of the flexible diaphragms 72a and 72b is clamped against its corresponding guard member 102a and 102b by means of washers 104 which are brought snugly into clamping position by means of the nut 105 which engages a threaded bottom extremity of the piston 45. The space between the two diaphragms is vented to atmosphere.

Referring to Figure 5, which shows the air pressure piping arrangement connected to the pilot valve 38 which is shown in Figure 1, and in addition, shows piping which permits the use of another valve damping method. It will be seen that, in Figure 5, a gate valve 106 has been added to the signal line 68 so that air flow therethrough may be cut off completely when desired. Also, a four-way fitting 107 has been suitably positioned in the automatic control header 35 near the passageway 39 in the valve body 40. The four-way fitting permits communication between the header 35 and the top diaphragm chamber 67 by means of an air line 108, having suitably positioned therein a valve 109 for selectively opening and closing the line 108.

The four-way fitting 107 also permits communication between the header 35 and the surge tank 79 by means of a surge tank line 110, suitably connected to the four-way fitting 107 and to the surge tank line 77 by means of a T connection 111. The surge tank line 110 has a throttle valve 112 therein for restricting the flow of air into the surge tank line 110 from the header 35. The throttle valve 112 is positioned near the four-way fitting 107, and a T connection 113 is positioned in the surge tank line 110 on the side of the throttle valve 112 opposite the side at which the four-way fitting 107 is positioned. The T connection 113 permits communication between the surge line 110 and the upper diaphragm chamber 73 adjacent the bottom diaphragm 72 by means of an air line 114.

It will thus be seen that there are two ways of producing a damping action upon the valve 38. One of such ways involves operation wherein the valves 109 and 112 are closed, the valve 106 is wide open and the throttle valve 78 is opened slightly so as to afford a restriction in the flow of air through the surge line 77. In such operation, as hereinbefore explained, an increase in the air pressure in the signal air pressure 46 effects an upward thrust against the top diaphragm 70 and the bottom diaphragm 72 by effecting an increase in the diaphragm chambers 67 and 74 respectively. After a controlled relatively short period of time depending upon the extent to which the throttle valve restricts flow, the pressure in the surge tank 79 will have increased to the extent to which the pressure in the signal header 46 has increased and a downward thrust is then exerted against the bottom diaphragm 72. The downward thrust against the diaphragm 72 tends to return the piston 45 back to its original position.

As will be appreciated, the length of time required for the valve 38 to release pressure from the headers 22 and 35 by upward movement of the piston 45, and the subsequent release of pressure at the air brake assembly 17 followed by the decrease in tension upon the web 10, may be so substantial a length of time that the pressure in the headers 22 and 35 will have dropped way below that necessary before the pressure in the signal header 46 has dropped sufficiently to prevent the valve piston 45 to go back to normal position. Accordingly, by the use of the instant damping means, the valve piston 45 may be urged back to normal position a short time prior to the actual decrease in pressure in the signal header 46.

In the operation of the damping method employing the additional damping arrangement shown in Figure 5, the valves 106 and 78 are closed tight, the valve 109 is opened wide and the valve 112 is opened slightly so as to present a restriction in the flow of air through the surge tank line 110. The operation is thus changed to the extent that damping action is obtained by means of communication with the fluctuating air pressure in the automatic control header 35 instead of by means of the fluctuating air pressure in the signal header 46.

In such operation, if the pressure decreases in the signal header 46, the pressure in the lower diaphragm chamber 74 adjacent the diaphragm 72 is correspondingly decreased and the spring 71 urges the piston 45 downwardly so as to permit communication between the automatic control header 35 and the control supply header 41, which in turn effects an increase in the air pressure in the automatic control header 35 and the actuating air pressure header 22. Prior to the foregoing change in the valve position, the pressure in the top diaphragm chamber 67 was equal to the pressure in the upper diaphragm chamber 73 adjacent the bottom diaphragm 72, and the surge tank 79 also contained air at the same pressure. However, shortly after the valve piston position changes so as to permit the increase in pressure in the automatic control header 35, the pressure in the top diaphragm chamber 67 also increases, thereby tending to return the piston 45 to its normal position. The pressure in the upper diaphragm chamber 73 adjacent the diaphragm 72 will, of course, tend to resist the upward thrust caused by the increase in pressure in the top diaphragm chamber 67. It will thus be seen that this particular damping mechanism tends to prevent rapid increases or decreases in the pressure in the header 35.

It will be understood that modifications and variations may be effected without departing from the scope of the novel concepts of the present invention.

I claim as my invention:

1. Tension control means for sheet material comprising a rotating roll having sheet material traveling therefrom, a fluid pressure responsive brake for said roll, a source of fluid under pressure, a fluid pressure responsive valve in control of fluid communication between said brake and said source, conduit means in communication with said source for communicating actuating fluid pressure to said fluid pressure responsive valve, and bleed valve means in said conduit means adapted to engage the traveling sheet for controlling air pressure in said conduit means in response to the tension on the traveling sheet material, said bleed valve means comprising a shoe member adapted to slidably engage the traveling sheet material and to be urged thereagainst, a diaphragm means for selectively venting and closing said conduit means in response to flexural movement thereof and a pivotal arm connected to said shoe member and drivingly engaging said diaphragm means.

2. An apparatus comprising a roll unwinding traveling sheet material, an air brake for said roll, a pilot valve cylinder, a first passageway in said cylinder adapted to communicate with the air brake, a second passageway in said cylinder spaced from the first passageway and adapted to communicate with an air pressure source, a third passageway in said cylinder spaced from the first and second passageways and communicating with the atmosphere, a pilot valve piston in said cylinder adapted to selectively open and close said passageways to effect communication therebetween, air pressure responsive flexible diaphragm means drivingly engaging said piston, an actuating pressure line communicating with said diaphragm means and adapted to communicate with an air pressure source, and bleed valve means in said line adapted to engage the traveling sheet for controlling air pressure in said line in response to the tension on the traveling sheet material, said bleed valve means comprising a shoe member adapted to slidably engage the traveling sheet material and to be urged thereagainst, a second diaphragm means for selectively venting and closing said line in response to flexural movement thereof and a pivotal arm connected to said shoe member and drivingly engaging said second diaphragm means.

3. In apparatus for controlling an air brake on a roll unwinding sheet material in order to maintain a predetemined tension on the traveling sheet of material, a pilot valve cylinder, a first passageway in said cylinder, a first conduit in communication therewith and adapted to communicate with the air brake, a second passageway in said cylinder spaced from the first passageway adapted to communicate with an air pressure source, a third passageway in said cylinder spaced from the first and second passageways and communicating with the atmosphere, a pilot valve piston in said cylinder adapted to selectively open and close said passageways to effect communication therebetween, diaphragm means drivingly engaging said piston, a second conduit communicating with an air pressure source for actuating said diaphragm means, and bleed valve means in said second conduit adapted to engage the traveling sheet for controlling air pressure in said second conduit in response to the tension on the traveling sheet, said diaphragm means comprising a pair of spaced diaphragms drivingly connected to said piston, a spring against one diaphragm urging it in one direction, means affording communication between one of the diaphragms and said second conduit for urging said diaphragms in a direction opposite to said one direction, a second means affording communication between said second conduit and a diaphragm for urging that diaphragm in a direction opposite to said one direction, and means affording restricted communication between said second conduit and one of said diaphragms for urging that diaphragm in said one direction.

4. An apparatus comprising a roll unwinding traveling sheet material, an air brake for said roll, a pilot valve cylinder, a first passageway in said cylinder communicating with the air brake, a second passageway in said cylinder communicating with an air pressure source, a third passageway in said cylinder spaced from the first and second passageways and communicating with the atmosphere, a pilot valve piston in said cylinder adapted to selectively open and close said passageways to effect communication therebetween, air pressure responsive flexible diaphragm means drivingly engaging said piston, an actuating air pressure line communicating with said diaphragm means and with said air pressure source, and bleed valve means in said line adapted to engage the traveling sheet for controlling air pressure in said line in response to the tension on the traveling sheet.

5. Apparatus comprising a roll unwinding traveling sheet material, an air brake for said roll, a pilot valve cylinder, a first passageway in said cylinder communicating with the air brake, a second passageway in said cylinder spaced from the first passageway and communicating with an air pressure source, a third passageway in said cylinder spaced from the first and second passageways and communicating with the atmosphere, a pilot valve piston in said cylinder adapted to selectively open and close said passageways to effect communication therebetween, air pressure responsive flexible diaphragm means drivingly engaging said piston, an actuating air pressure line communicating with said diaphragm means and with an air pressure source, and bleed valve means in said line adapted to engage the traveling sheet for controlling air pressure in said line in response to the tension on the traveling sheet, said bleed valve means comprising a shoe member adapted to slidably engage the traveling sheet and to be urged thereagainst, and passageways in said shoe member for effecting communication between said line and the traveling sheet in slidable engagement with said shoe member.

6. Apparatus comprising a rotating roll, sheet material traveling over the rotating roll, a fluid pressure responsive brake for said roll, a source of fluid under pressure, a fluid pressure responsive valve in control of fluid communication between said brake and said source, conduit means in communication with said source communicating actuating fluid pressure to said fluid pressure responsive valve, and bleed valve means in said conduit means engaging the traveling sheet material for controlling air pressure in said conduit means in response to tension on the traveling sheet material, said bleed valve means comprising a shoe member slidably engaging the traveling sheet material and urged thereagainst, and passageways in said shoe member effecting communication between said conduit means and the traveling sheet material in slidable engagement with said shoe member.

7. Tension control means comprising a roll having sheet material traveling therefrom, a fluid pressure responsive brake for said roll, a source of fluid under pressure, a fluid pressure responsive valve in control of fluid communication between said brake and said source, a conduit in communication with said source communicating actuating fluid pressure to said fluid pressure responsive valve, bleed valve means in said conduit presenting a leakage aperture adapted to engage the traveling sheet material for controlling fluid pressure in said conduit, and guide means directing the traveling sheet material in a path across said bleed valve means and in contact with said leakage aperture.

References Cited in the file of this patent
UNITED STATES PATENTS

| | | |
|---|---|---|
| 2,098,914 | Gorrie | Nov. 9, 1937 |
| 2,210,917 | Kenyon et al. | Aug. 13, 1940 |
| 2,261,891 | Stewart | Nov. 4, 1941 |
| 2,272,815 | Otto | Feb. 10, 1942 |
| 2,285,540 | Stein et al. | June 9, 1942 |
| 2,343,181 | Heinz | Feb. 29, 1944 |
| 2,400,126 | Matthews | May 14, 1946 |
| 2,444,245 | Campbell | June 29, 1948 |
| 2,552,189 | Kuehni | May 8, 1951 |
| 2,667,311 | Packer et al. | Jan. 26, 1954 |